UNITED STATES PATENT OFFICE.

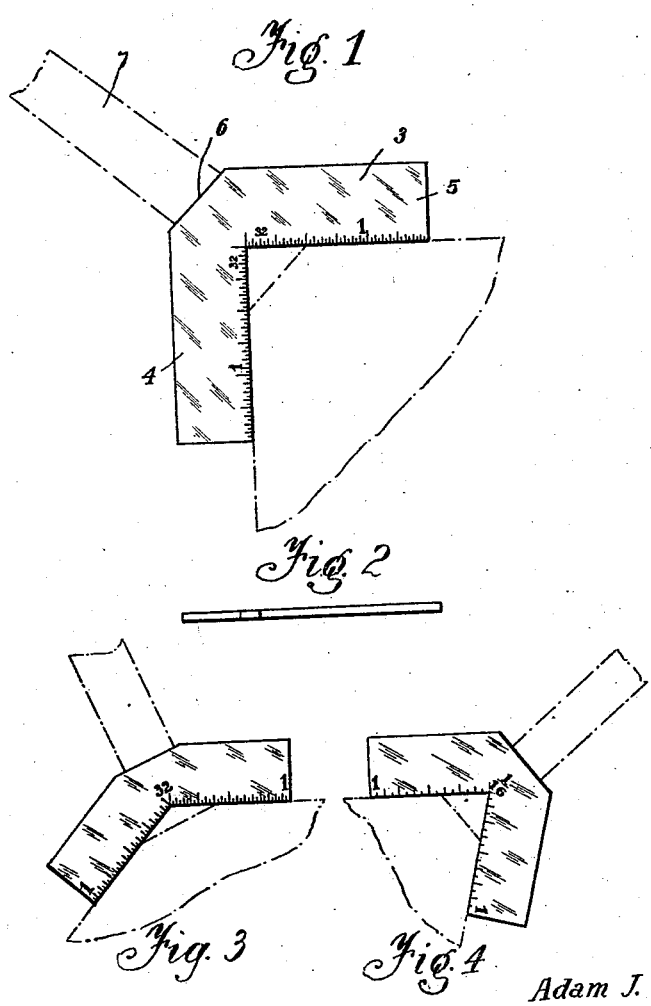

ADAM J. STOCK, OF WILKINSBURG, PENNSYLVANIA.

MACHINIST'S RULE AND GAUGE.

1,415,615.
Specification of Letters Patent. Patented May 9, 1922.

Application filed July 23, 1919. Serial No. 312,694.

*To all whom it may concern:*

Be it known that I, ADAM J. STOCK, a citizen of the United States, residing at Wilkinsburg, in the county of Allegheny and State of Pennsylvania, have invented certain new and useful Improvements in Machinists' Rules and Gauges, of which the following is a specification.

This invention relates to new and useful improvements in machinists' rules and gauges particularly to that type adapted for use when chamfering or beveling corners exact to dimensions.

The primary object of this invention is to provide a combination of machinists' rules and gauges of the character described and in a manner as hereinafter set forth, contemplating means for insuring accurate, precise and rapid adjustment of the cutter or any other suitable cutting means.

Further objects of this invention are to provide a device of the class specified which is very simple in its construction and arrangement, strong, durable and efficient in its use, and inexpensive to manufacture.

To the accomplishment of these and such other objects as may hereinafter appear, the invention consists of the novel construction herein specifically described and illustrated in the accompanying drawings, wherein is shown an embodiment of the invention, but it is to be understood that changes, variations and modifications may be resorted to that come within the scope of the claims hereunto appended.

In the drawings forming a portion of this specification and wherein like numerals of reference designate corresponding parts throughout the several views, Figure 1 is a plan view of the rule or gauge made in accordance with my invention, a cutting tool and a part of a work piece being shown so as to make clear the application of the rule or gauge.

Figure 2 is a side elevation of Figure 1.

Figures 3 and 4 are plan views of a modified form of my invention, showing my device contemplating the use on work bodies having sides at more or less than 90 degrees.

Referring more in detail to the drawing, there is shown in Figure 1, a rule or gauge 3 comprising two straight edged members or legs 4 and 5, each leg preferably of the same length, arranged to form a ninety degree angle and made from a single blank material. The vertex of the outside edges of the angle is beveled as shown at 6, at an angle of 45 degrees from the outside edges of the device. The rule or gauge is graduated on both flat sides of the legs.

In chamfering bores or corners of gears or any other work body, it is extremely difficult to cut the chamfer perfect, the eye of the operator is generally his only means of guiding or only possible by chance.

In applying the rule or gauge, the same is placed on the work with its inner edges against the work body as plainly illustrated in Figure 1; the cutting tool 7, is then set flush with the bevel edge 6, the rule is then removed, and the cutting tool is fed in the well known manner, and a perfect bevel or chamfer is thus obtained.

I am showing in Figure 3 and Figure 4 a modified form of my invention applied on work bodies having either obtuse or acute angle sides, the application of this modification being the same as shown in Figure 1.

Having fully described my invention, what I do claim as new and desire to secure by Letters Patent is:

1. A gauge of the character described made of a single piece of flat material and comprising a pair of straight legs of uniform width disposed angularly in one plane; the apex formed by the outer edges of said legs being cut normally to the bissectrix of the angle formed by said legs; said gauge being adapted to be placed with its reentrant angle in contact with the adjacent sides of an angular body.

2. A gauge of the character described made of a single piece of flat material and comprising a pair of straight legs of uniform width disposed angularly in one plane; the inner edge of each leg being graduated for linear measurements; the apex formed by the outer edges of said legs being cut normally to the bissectrix of the angle formed by said legs; said gauge being adapted to be placed with its reentrant angle in contact with the adjacent sides of an angular body.

In testimony whereof I affix my signature.

ADAM J. STOCK.